March 24, 1925.
J. J. MILLER
1,531,208
FREIGHT CAR CONSTRUCTION
Filed Aug. 1, 1922
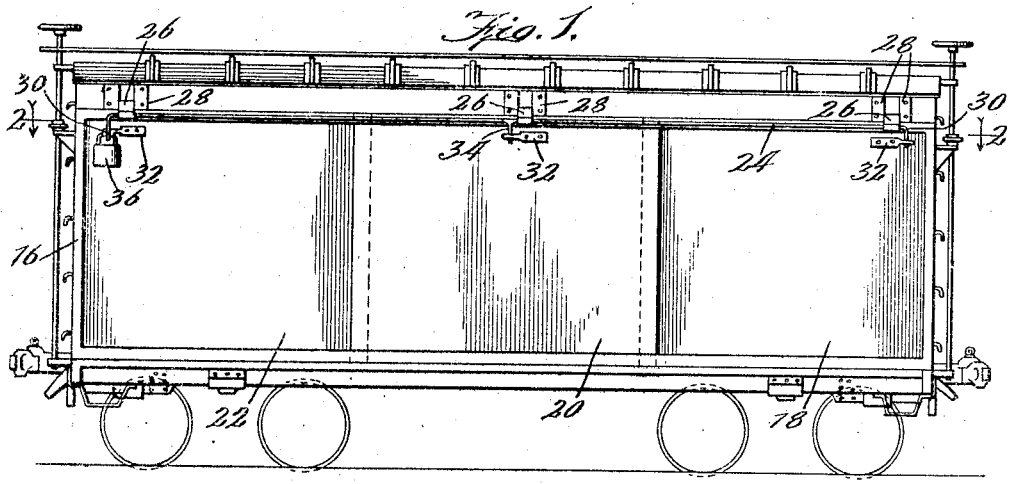
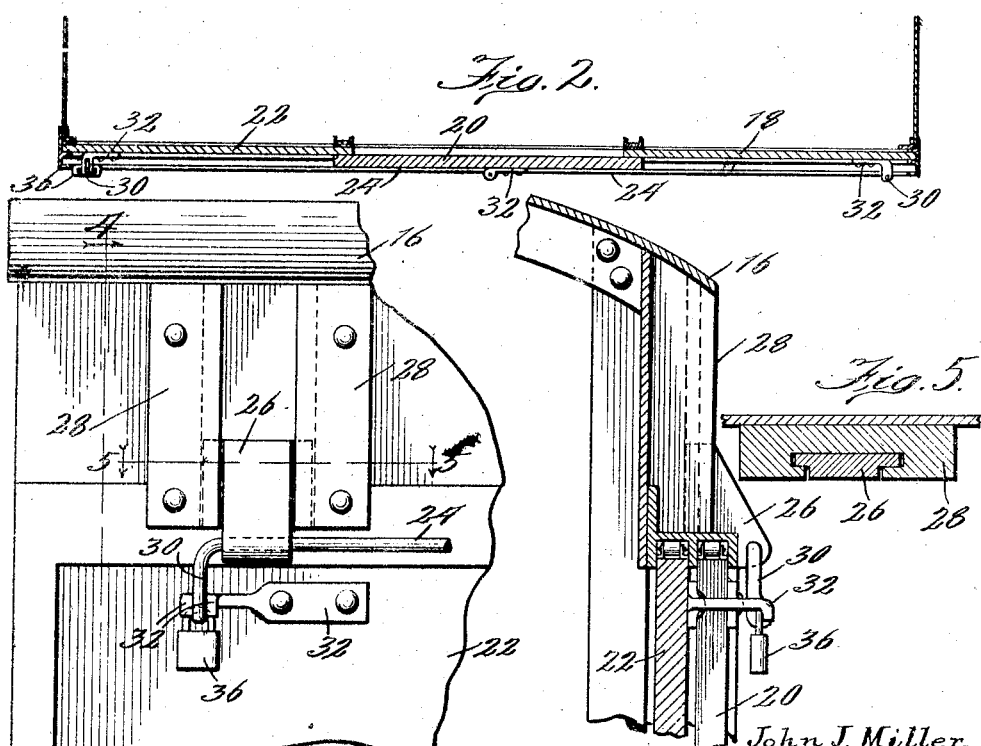

Patented Mar. 24, 1925.

1,531,208

UNITED STATES PATENT OFFICE.

JOHN J. MILLER, OF CHICAGO, ILLINOIS.

FREIGHT-CAR CONSTRUCTION.

Application filed August 1, 1922. Serial No. 578,971.

*To all whom it may concern:*

Be it known that I, JOHN J. MILLER, a citizen of the United States, residing at Chicago, in the county of Cook and State of Illinois, have invented certain new and useful Improvements in Freight-Car Construction; and I do hereby declare the following to be a full, clear, and exact description of the invention, such as will enable others skilled in the art to which it appertains to make and use the same.

This invention relates to improvements in freight cars or the like and has for its particular object the provision of a freight car having the door or doors thereof so constructed as to enable practically the entire side of the car to be opened for purposes of loading or unloading.

Another object of this invention is the provision of an improved locking means for a slidable freight car door construction which will enable the simultaneous locking of a plurality of doors on a single car side and with the use of only one locking device or seal.

Still another object of this invention is the provision of a freight car provided with a set of slidable doors in grooves on each side thereof so constructed that either end or the middle of the freight car may be opened for simultaneous loading and unloading purposes and thereby eliminating the necessity of removing freight through the middle door which has been heretofore used in the ordinary freight car construction.

Another important object of the invention is the provision of an improved railroad car adapted to be used as a box car and which can be readily opened at any part to unload some of the contents without disturbing the remainder, or which can be simultaneously loaded and unloaded at opposite or the same end or the middle thereof with a minimum expenditure of time and labor.

Another and further important object of the invention is the provision of a slidable freight car door construction wherein the doors may be superimposed upon each other so that in the case of use of three doors of the kind described approximately two-thirds of the length of the car may be opened for purposes of loading or unloading.

Other and further important objects of the invention will be apparent from the disclosures in the accompanying drawings and following specification.

The invention, in a preferred form, is illustrated in the drawings and hereinafter more fully described.

In the drawings:

Fig. 1 is a side elevation of a box car constructed in accordance with the present invention, showing the method of mounting the doors;

Fig. 2 is a sectional view taken on the line 2—2 of Fig. 1;

Fig. 3 is a detail elevation showing a corner of the improved construction;

Fig. 4 is a sectional view taken on the line 4—4 of Fig. 3;

Fig. 5 is a sectional view taken on the line 5—5 of Fig. 3 looking in the direction indicated by the arrows.

As shown in the drawings, the reference numeral 16 indicates generally the body of a freight car in all of the figures and in each case is provided with a plurality of doors, preferably three in number, along each of its sides and which, in the preferred form of the invention, comprise the entire side of the car on both sides thereof, as shown by the reference numerals 18, 20 and 22, respectively.

Channels or runways are provided at both the top and bottom of the car for the reception of the doors. As shown in the drawings, only two of these channels or runways are illustrated but obviously three channels may be provided which will then thereby admit of the opening of two-thirds of the side of the car as the doors 18, 20 and 22 may be all superimposed upon one another. The vertical brace members 19 will suffice to fill any gaps between the inner and outer sections at their adjacent edges in the event that three channels are used.

As shown in Fig. 1, a locking means is provided which will automatically lock all three of the doors at a single operation. In the modification of the invention illustrated in Fig. 1, this locking means comprises a horizontal bar extending longitudinally of the car, and at the tops of the doors, as shown at 24, which bar 24 is provided at either end and at its middle with a lug 26 affixed thereto by riveting, spot-welding or otherwise, and which lug 26 is formed in a cross-sectional T-shape as shown in Fig. 5, and is adapted to slide in a dovetail groove formed in a retaining member 28 fastened to the top or overhanging frame of the car itself. Suitable stop means are provided to prevent the lug 26 from becoming disengaged from the dovetailed member 28. Both ends of the bar 24 are curved downwardly as shown at 30, these downwardly extending ends being adapted to enter and pass through openings in latches or locking members 32 securely affixed to the car doors 18 and 22. A similar downwardly extending member 34, corresponding to the downwardly extending ends 30, is provided at the middle portion of the rod 24 which also co-operates with a latch or locking means 32 on the middle door 20 by passing through a vertically disposed opening therein. As shown in Fig. 1, a lock or seal 36 is provided, adapted to pass through a suitable opening in any one or all of the downwardly extending members 30 or 34, whereby the horizontally extending bar 24 may be securely locked in position with respect to the latches 32. As it is common in handling freight cars to use only one locking means or seal, this particular locking device illustrated eliminates the necessity of three locks or seals which would ordinarily be necessary in a three-door construction as illustrated.

It will be evident that by means of this improved construction either or both ends of the car side may be opened, as desired, for the purpose of loading or unloading or for the purpose of simultaneous loading and unloading, and further, that by the use of the locking means herein provided there is no possibility of any unauthorized tampering with the contents of the car. Further, there is no necessity of the employment of a plurality of locks which would ordinarily be necessary in a three-door car construction of this sort. Again, by the use of a separate groove for each of the three doors on each side of the car, two-thirds of the length of the car may be opened for convenient loading and unloading of material which would be ordinarily very difficult if not impossible to handle, as long sticks of lumber or large bales of goods or the like.

I am aware that many changes may be made and numerous details of construction varied throughout a wide range without departing from the principles of this invention, and I therefore do not propose limiting the patent granted hereon otherwise than as necessitated by the prior art.

I claim as my invention:

In a box car, a plurality of doors extending along one side thereof, and means for simultaneously locking said doors in closed relation, said means including a bar extending longitudinally of the box car and adjacent the top thereof, a plurality of guideways mounted on said car, a corresponding number of lugs attached to the bar and adapted to co-operate with said guideways, latch means on each of said car doors, and extensions on the bar adapted to co-operate with said latch means.

In testimony whereof I affix my signature.

JOHN J. MILLER.